United States Patent
Kim

(10) Patent No.: US 10,157,342 B1
(45) Date of Patent: Dec. 18, 2018

(54) SYSTEMS AND METHODS FOR TRANSFORMING SENSORY INPUT INTO ACTIONS BY A MACHINE HAVING SELF-AWARENESS

(71) Applicant: Nam Kim, Duluth, GA (US)

(72) Inventor: Nam Kim, Duluth, GA (US)

(*) Notice: Subject to any disclaimer, the term of this patent is extended or adjusted under 35 U.S.C. 154(b) by 0 days.

(21) Appl. No.: 16/044,875

(22) Filed: Jul. 25, 2018

Related U.S. Application Data

(63) Continuation-in-part of application No. 13/294,896, filed on Nov. 11, 2011, which is a continuation-in-part of application No. 12/834,003, filed on Jul. 11, 2010, now abandoned.

(51) Int. Cl.
| | |
|---|---|
| *G01C 21/00* | (2006.01) |
| *G06N 3/00* | (2006.01) |
| *B25J 9/16* | (2006.01) |
| *G06F 17/30* | (2006.01) |
| *G06F 17/28* | (2006.01) |

(52) U.S. Cl.
CPC .............. *G06N 3/008* (2013.01); *B25J 9/163* (2013.01); *G06F 17/2872* (2013.01); *G06F 17/30952* (2013.01)

(58) Field of Classification Search
CPC ................ G06N 3/008; G06F 17/2872; G06F 17/30952; B25J 9/163
See application file for complete search history.

(56) References Cited

U.S. PATENT DOCUMENTS

| | | | | |
|---|---|---|---|---|
| 10,043,511 | B2* | 8/2018 | Baughman | G06F 17/2705 |
| 10,043,521 | B2* | 8/2018 | Bocklet | G10L 17/04 |
| 10,055,399 | B2* | 8/2018 | Craymer, III | G06F 17/271 |
| 10,057,421 | B1* | 8/2018 | Chiu | H04M 3/4936 |
| 10,068,573 | B1* | 9/2018 | Aykac | G10L 15/22 |
| 10,079,012 | B2* | 9/2018 | Klimanis | G10L 15/065 |
| 10,079,021 | B1* | 9/2018 | Barra Chicote | G10L 13/04 |

* cited by examiner

*Primary Examiner* — Ian Jen
(74) *Attorney, Agent, or Firm* — Brient IP Law, LLC

(57) ABSTRACT

A computer system for transforming sensory input received at a machine into actions by the machine. The system receives sensory input from one or more sensors. Upon determining that the sensory input corresponds to a consciousness module, the system translates the input into a human language stimulus. The system selects an action corresponding to the human language stimulus and performs the action.

24 Claims, 9 Drawing Sheets

Tempo

Happines

Humor

Reaction Time

Pattern 1

Pattern 2

SYSTEMS AND METHODS FOR TRANSFORMING SENSORY INPUT INTO ACTIONS BY A MACHINE HAVING SELF-AWARENESS

BACKGROUND

There has long been a desire to create an artificial personality that can closely approximate the personality of a human being. However, current artificial personalities (e.g., the personalities of automated attendant systems and modern robots) fall far short of this objective. Conventional robots or machines that receive inputs from any number and type of sensors are programmed to perform an action in response to the input. For example, a conventional robot may "hear" a verbal command to walk, and based on a pre-programmed response to the verbal command, the robot may walk. "Thinking" for a conventional robot is nothing more than mathematics and algorithms used to determine that input X equals output Y. The robot has no self-consciousness and no sense of self-awareness that allows it to respond to stimuli in a manner similar to humans in a manner that may depend in large part on its personality or mood. Conventional robots do not have an artificial personality that closely mimics the personalities of humans. Accordingly, there is a need for improved systems and methods for creating an artificial personality.

SUMMARY OF VARIOUS EMBODIMENTS

It should be appreciated that this Summary is provided to introduce a selection of concepts in a simplified form that are further described below in the Detailed Description. This Summary is not intended to be used to limit the scope of the claimed subject matter.

A computer-implemented method for transforming sensory input received at a machine into actions by the machine is provided. According to one aspect, the method includes receiving a first sensory input from one or more sensors and determining that the first sensory input corresponds to a consciousness module. In response to determining that the first sensory input corresponds to the consciousness module, the first sensory input is translated into a human language to create a human language stimulus. An action corresponding to the human language stimulus is selected and performed.

According to another aspect, a system is provided for transforming sensory input received at a machine into actions by the machine. The system includes one or more sensors, memory, at least one processor, a consciousness module, a sub-consciousness module, and a personality waveform generator. The consciousness module is stored in the memory, coupled to the at least one processor, and is operative to receive a first sensory input from the one or more sensors, translate the first sensory input into a human language to create a human language stimulus, determine whether the human language stimulus requires a first action, and if the human language stimulus requires the first action, perform the first action. The sub-consciousness module is stored in the memory, coupled to the at least one processor, and is operative to receive a second sensory input from the one or more sensors, select a second action corresponding to the second sensory input, and perform the second action in response to the second sensory input. The personality waveform generator is operative to generate a waveform corresponding to an artificial personality. The first action or the second action may be selected according to the waveform at a particular time or a particular time range associated with the first sensory input or the second sensory input.

According to yet another aspect, a computer-implemented method for transforming sensory input received at a machine into actions by the machine is provided. The method includes receiving a first sensory input from one or more sensors and translating the first sensory input into a human language to create a human language observation. In response to the human language observation, an unspoken human language stimulus is created. A first action is selected corresponding to the unspoken human language stimulus from a plurality of responses defined by a light wave. The light wave corresponds to an artificial intelligence associated with the machine. The first action is then performed in response to the human language stimulus.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

Having described various embodiments in general terms, reference will now be made to the accompanying drawings, which are not necessarily drawn to scale, and wherein.

DETAILED DESCRIPTION OF VARIOUS EMBODIMENTS

Philosophical Introduction

Evolution of Self-Consciousness

Figure 1:
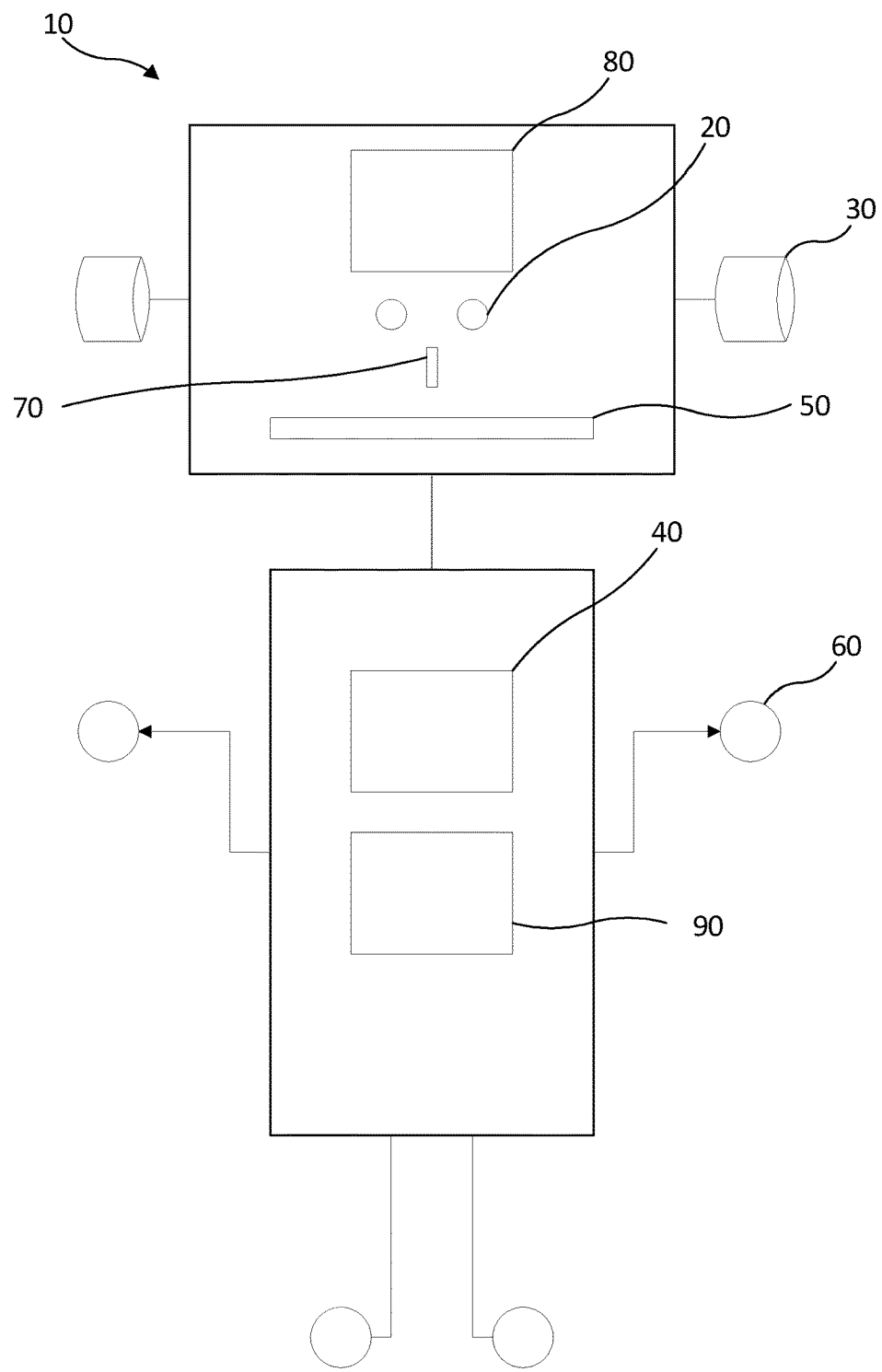
FIG. 1 is a block diagram of a robot that includes the system.

Humans have the ability to continuously recognize their own existence and to memorize upcoming new experiences. Through this process, they develop a stronger sense of self awareness.

For example, a five-year-old may only know his name and his basic elementary facts, but he does not "really" know who or what he is. In contrast, a twenty-year-old can recall his past experiences through school, different strengths and weaknesses about his personality, infinite memories and emotions that he has experienced, and so on, so that he can create his own profile.

As time progresses, individuals continue to build and grow their experiences, so that they learn more about themselves and strengthen their identities. Various systems described within this patent do the same. In various embodiments, a robot or machine collects memories as time progresses and recalls them to help strengthen its identity. In this way, the robot can not only establish his self-consciousness in the present tense, but also build upon, reinforce, and strengthen it throughout time.

Establishing one's self, a mental physical territory, provides a clear distinction between one's self and others which are further classified into second and third persons. This process sets up a system by which to logically distinguish one's self from others, laying the foundation on which to program a system to accomplish the same.

The Importance of Realizing One's Own Self-Consciousness

There are two main reasons as to why it is critical to recognize one's self as a being. First, recognizing one's self allows for the recognition of second and third person elements outside that being. In other words, one would begin to use the pronoun "my, I, mine, etc." and realize what is "yours, his, hers, theirs," etc. That way, one can recognize and distinguish between first, second and third person elements and perspectives. If one begins to realize his or her own consciousness, then one begins to recognize what belongs to one's self: one's body, one's feelings, one's thoughts, etc. Everything that belongs to others and one's self can be established and distinguished between. Through this, one can understand and create relationships between others and one's self.

The second point is a bit theoretical, but equally important. Establishing and realizing one's self-consciousness (i.e., sense of self-awareness) is imperative for the world around that being to exist. That can be better understood by the use of an analogy of dreams. When one dreams, one dives into a world created by one's sub-consciousness. In the dream, there are people, places and things. However, this dream world only exists if one is in it and recognizes that they are their own person. When one wakes up and exits that dream, that world no longer exists. The same is true for the real world. Without recognizing self-consciousness, the robot or machine cannot truly interact with its surroundings and claim that it exists.

There are many robotic programs and applications that have been developed in this field. For instance, computers and other hardware have the abilities of voice recognition, writing recognition, image recognition, etc. These programs in tandem with a self-consciousness system can create a robot whose self-consciousness will mirror a human's.

Additionally, establishing and recognizing one's self-consciousness allows a machine or robot to begin to value itself. In this way, it may have ambitions or actions to help preserve or improve itself. Furthermore, in various implementations, it is critical that the robot uses elements that are not only in present time, but also from its past. It must recall both present and past elements for it to fully have a self-consciousness like humans. Therefore, the ability for the robot to recall its past history and memory is necessary for it to further strengthen and establish its self-consciousness.

All in all, recognizing one's self-consciousness and establishing "I" is a fundamental element imperative for creating artificial intelligence. This system uses the algebraic phrase, A=B, B=C, so A=C to translate actions as proof for one's existence by relaying "I exist." This method, at first glance, may appear meaningless and mechanical; however, this system's application does not end here. Instead, it is far more important that the robot uses the system to continually remind itself and learn that it exists. In other words, this method can be used to tell others that it exists, to understand its own existence, or to make it appear as if the robot believes its own existence.

Types of Thought

Thought is categorized broadly into two types: (1) subconscious thought that is unconscious, instinctive and reflexive; and (2) conscious thought that is conscious and intentional. Subconscious thought refers to an instinctive form of thought including such unconscious acts of thought as instantaneous judgment, discernment, etc., reflexive thought, instinctive thought, etc. Consider that one can drive a car with or without consciousness. Similarly, when one walks, one puts forward a leg first, right or left, consciously or unconsciously. Either way, their roles are not affected. This evidently demonstrates the difference between subconscious and conscious thought. Subconscious thought indicates instinctive thought, thought programmed in sub-consciousness and thought accumulated by experience and not directly made conscious.

For artificial intelligence to conduct an act of conscious thought as humans do, it may remind itself of its own language (voice), images, and necessary memories and experiences by means of language and visual images. Consider a space. It could be two-dimensional, three dimensional or digitalized and virtual. Now consider that the space is a box and the box contains an apple. Artificial intelligence, while watching the apple, has its image and voice simultaneously realized in this space as it independently visualizes an apple and says, "Apple." After this process, it says, "Apple" on the basis of an analysis of the image and voice. Information is relayed into language or images, and is intentionally analyzed one more time. This method enables artificial intelligence to think by will or consciously; thinking about something in language, realizing its voice and then being reminded by the voice.

The Importance of Human Language in Thought Processes

Every human has a native language that he or she speaks and thinks with. When faced with a stimulus (i.e., seeing a sunrise, hearing a bird, feeling a nudge or tap on a shoulder), a person might comment on the stimulus within their thoughts before taking action. For example, when viewing a sunset, a person might think to themselves, "that's a beautiful sunset," and as a result of that reaction, the person might take a picture, walk to another location for a better viewpoint, or call out to another person to join them for the view. In contrast, a conventional robot might be programmed to respond to the sun's position being near the horizon at a particular time of day that indicates that the sun is setting by taking a photograph or notifying another. However, there is no thought process with the conventional robot. The conventional robot does not translate the stimulus into a human language or react to the stimulus using language internally before selecting a response. Nor does the response selected by the conventional robot depend upon a mood or personality associated with the robot.

Human beings are not merely programmed to react to a stimulus with a particular response. The manner in which a person responds to the same stimulus at different times often depends on the personality of the person. A person's reaction to an aggressive or threatening stimulus may vary significantly depending on the base personality of the person. A person with a hot temper may react by fighting back. A shy, fearful person may run. An even-tempered person may attempt to diffuse the situation and bring about peace.

In addition, even though a person's general personality may drive the person's responses to particular stimuli, those same stimuli may provoke different reactions according to the person's mood at the particular time. For example, a person sitting on an airplane may choose to engage in a conversation with the person next to them on one flight, while staying silent, reading, or listening to music on another flight. The only difference in the choices made during the different times may be the mood that the person was in at the particular time. The choice of action is not entirely random, but dependent on how the person is "feeling" at the time. In making the choice and even determining the mood that the person is in, he or she may be contemplating the choices and their feelings in their language in their mind. For example, the person may literally ask themselves in English in their thoughts "what do I feel like doing? I don't really think I feel like reading, maybe I'll just take a nap." That person is making choices based on analyzing their mood and feelings, using thought in their native language. Conventional robots do not think in a human language, and do not make decisions based on an underlying personality or mood at a given moment.

Mental Patterns

Often, it is thought that thought or thinking is infinite and free from control or restraint. This is wrong. Freedom, free will, and emotion are limited. Some people are full of emotion and others are not. There are those who are endowed with thought and there are those who are not. This applies to intelligence, imagination, artistic talent, etc. Any mental function is subject to limitation.

Consider character and personality—a hot temper and an even temper, extroversion and introversion. It cannot be denied that these qualities are set in a mental frame, inborn or acquired. We are well aware that physical limitations and mental patterns are affected by such inherent data as DNA and RNA. The programs built in our sub-consciousness restrain our thought.

Life obviously cannot stay off the frame of programs formed with data and concepts as is the computer dependent on its built-in software. What is referred to as mind and emotion, and even freedom have their maximum and minimum values. The three maintain random free patterns but are still in a limited frame set.

Completion of Self-Consciousness

Figure 9:
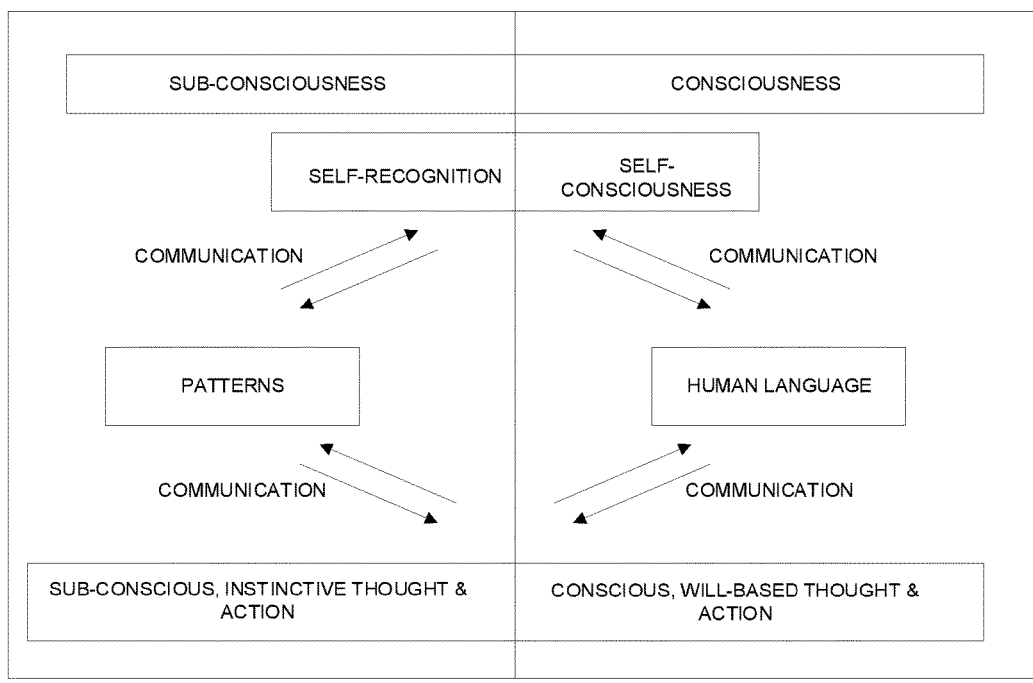
FIG. 9 depicts a flow chart that generally illustrates the communication between consciousness and sub-consciousness.

Self-consciousness is interpreted as independent knowledge of one's self. Self-consciousness further includes the phenomena that life is a state of subjective consciousness, existing as an individual self, and subjective consciousness (thought) of an individual being can be understood solely on the basis of objective facts. The seemingly conflicting two core theories can be supported by an evolution from self-recognition to self-consciousness, creation of mental patterns, and strong communication between consciousness and sub-consciousness as shown in FIG. 9. This theory places all kinds of physical and mental basic function (self-recognition function), latent or instinctive thinking function, patterns, physically active or instinctive function, etc. under the category of sub-consciousness.

Overview

An identifying self-conscious system according to various embodiments comprises one or more sensing systems that are connected to communicate with a computer via any suitable network (e.g., the Internet or a LAN). In various embodiments, the system is adapted to form part of a robot. In particular embodiments, the sensing systems may be vision systems, sound sensors, thermal sensors, taste sensors, touch sensors, or smell sensors that are adapted to communicate with the computer. It should be understood, however, that any other suitable hardware arrangement may be used to implement various embodiments of the systems described below.

In various embodiments, the system is adapted to obtain, save to memory, and process feedback from various sensing systems and to use the feedback to reaffirm the existence of the system. For example, the system may: (1) request feedback from one or more sensing systems; (2) determine whether the one or more sensing systems provided feedback; and (3) reaffirm its own existence upon receiving feedback from the one or more sensing systems. The system may request feedback substantially continuously (e.g., continuously) in order to reaffirm its existence.

In various embodiments, the system may be adapted to perform other functions while it reaffirms its own existence. These other functions may include performing tasks, responding to external stimuli, and any other appropriate functions.

In various embodiments, the system may be adapted to select a response to a particular stimulus. For example, the system may: (1) establish potential responses to a particular stimulus; (2) select a subset of potential responses based on an artificial personality; (3) wait for the particular stimulus; (4) determine whether the particular stimulus has occurred; (5) select a response to the particular stimulus from the subset of potential responses based at least substantially on an artificial personality; and (6) perform the selected response.

In various embodiments, the system may include an artificial personality that may be used to select a response to a particular stimulus. In various embodiments, the artificial personality may be determined by at least one waveform. For example, a certain personality trait may be represented by a light wave generated within the system or detected external to the system. Within the light wave representing the personality trait, differences in waveform characteristics such as frequency, wavelength, or amplitude may be used to represent different responses to particular stimuli. When a particular stimulus is received, a response may be selected based on the configuration of the light wave at the time the stimulus is received. For example, if a system receives a particular stimulus while its light wave is at a certain wavelength, it may select the response associated with that certain wavelength for that particular stimulus.

In various embodiments, the system may translate stimuli received from various sensors into human language to create a human language stimulus. The human language stimulus is equivalent to human thought, similar to a person thinking to themselves in their native language. Based on this human language stimulus, the proper response may be selected according to an artificial personality that may be based on a configuration or characteristic of a waveform at the time that the stimulus is received. In this manner, the system is conscious of its existence and responding to stimuli in a human language according to a personality and even mood that is defined by a waveform.

Various embodiments will now be described more fully hereinafter with reference to the accompanying drawings, in which various relevant embodiments are shown. The invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Exemplary System Architecture

FIG. 1 shows a block diagram of a robot including an identifying self-conscious system 10 according to a preferred embodiment of the present invention. For the purposes of this disclosure, the identifying self-conscious system 10 may alternatively be referred to as a "robot" or "machine." As may be understood from this figure, the identifying self-conscious system 10 includes a vision system 20, a sound sensor 30, a thermal sensor 40, a taste sensor 50, a touch sensor 60, a smell sensor 70, at least one computer 80, and a personality waveform generator 90. In this embodiment, the computer 80 is adapted to communicate with the vision system 20, sound sensor 30, thermal sensor 40, taste sensor 50, touch sensor 60, and smell sensor 70 to receive feedback information. The vision system 20 is adapted to provide the computer 80 with feedback relating to visual stimuli; the sound sensor 30 is adapted to provide the computer 80 with feedback relating to audible stimuli; the thermal sensor 80 is adapted to provide the computer 80 with feedback relating to temperature (e.g., temperature fluctuations); the taste sensor 50 is adapted to provide the computer 80 with feedback relating to taste stimuli; the touch sensor 60 is adapted to provide the computer 80 with feedback relating to touch; and the smell sensor 70 is adapted to provide the computer 80 with feedback relating to odor stimuli.

In response to the feedback from the various sensor systems, the computer 80 is adapted to determine a response to the stimuli. The response is determined according to a characteristic of a waveform created by the personality waveform generator 90 at a time or period of time encompassing the stimuli. Depending on the particular stimuli, the computer 80 may additionally utilize a translation module to translate the stimuli into a human language to create a human language stimulus. The human language stimulus triggers the computer 80 to select a response according to the waveform generated by the personality waveform generator 90. This process will be described in greater detail below with respect to FIG. 3.

Figure 2:
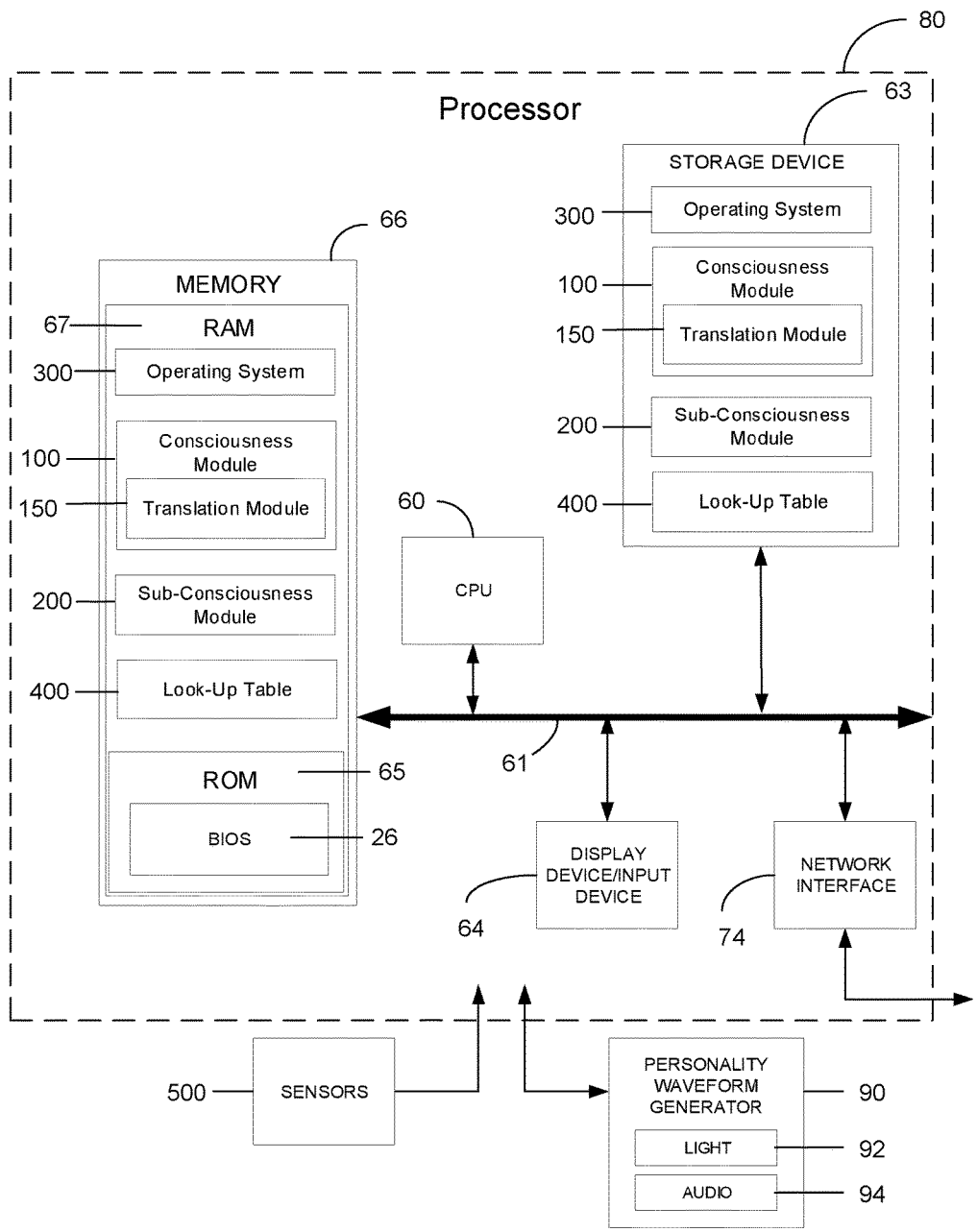
FIG. 2 is a block diagram of the computer of the robot of FIG. 1.

FIG. 2 shows a block diagram of an exemplary embodiment of the computer 80 of FIG. 1. The computer 80 includes a CPU 62 that communicates with other elements within the computer 80 via a system interface or bus 61. Also included in the computer 80 is a display device/input device 64 for receiving and displaying data. The display device/input device 64 may be, for example, a keyboard, voice recognition, or pointing device that is used in combination with a monitor. The computer 80 further includes memory 66, which preferably includes both read only memory (ROM) 65 and random access memory (RAM) 67. The server's ROM 65 is used to start a basic input/output system 26 (BIOS) that contains the basic routines that help to transfer information between elements within the computer 80.

The various sensor systems described above with respect to FIG. 1 are shown and described herein as sensors 500. The sensors 500 are configured to detect any number and type of stimuli, including but not limited to, stimuli related to sight and visual input, sound and acoustic waves, taste, touch and tactile input, movement, temperature, atmospheric composition and conditions, and time. The sensors 500 provide input to the computer 80, which provides an appropriate conscious or sub-conscious response according to a mood or artificial personality associated with the identifying self-conscious system 10 at the time of the stimuli.

According to various embodiments, the mood or artificial personality associated with the identifying self-conscious system 10 is defined by characteristics of a waveform created by a personality waveform generator 90. The waveform may be any type of waveform, including light waves and sound waves. According to one embodiment, the personality waveform generator 90 includes a light source 92 that creates light waves that define or affect the responses to stimuli that the identifying self-conscious system 10 receives. According to another embodiment, the personality waveform generator 90 includes an audio source 94 that creates sound waves that define or affect the responses to stimuli that the identifying self-conscious system 10 receives. The personality waveform generator 90 will be described in greater detail below.

As seen in FIG. 2, the computer 80 also includes at least one storage device 63, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide non-volatile storage for the computer 80. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices 63 and within RAM 67. Such program modules include an operating system 300, a consciousness module 100, a translation module 150, a sub-consciousness module 200, and a look-up table 400. The consciousness module 100 and sub-consciousness module 200 control certain aspects of the operation of the computer 80, as is described in more detail below, with the assistance of the CPU 62 and an operating system 300. The translation module 150 translates stimuli received by the sensors 500 into a human language to create a human language stimuli as described below. The translation module 150 may operate as part of the consciousness module 100 of may be executed independently by the computer 80 or as part of, or in conjunction with, any other module or system associated with the computer 80. The look-up table 400 includes data associating any number and type of stimuli received from the various sensors 500 or human language stimuli with potential responses to those stimuli. For example, when the identifying self-conscious system 10 encounters a loud noise, potential responses stored with the look-up table 400 may include "run," "collect visual data (i.e., look towards the source of the sound)," "investigate noise by travelling to the source for data collection," "ask a nearby person about the noise," or many other possible responses. According to one embodiment, the response chosen is dependent upon characteristics of the waveform generated by the personality waveform generator 90 at the time of the noise.

Also located within the computer 80 is a network interface 74 for interfacing and communicating with other elements of a computer network. It will be appreciated by one of ordinary skill in the art that one or more of the computer 80 components may be located geographically remotely from other computer 80 components. Furthermore, one or more of the components may be combined, and additional components performing functions described herein may be included in the computer 80.

Personality Waveform Generator—Defining Artificial Personality

As mentioned above, the identifying self-conscious system 10 includes or utilizes a personality waveform generator 90 to define the boundaries of an artificial personality of the identifying self-conscious system 10. To understand the functionality of the personality waveform generator 90, a discussion of human personalities and moods will be provided.

Humans have unique personalities that define their overall thoughts and actions. For example, introverted people tend to be shy, avoid groups of people and situations that would put them at the center of attention. For these reasons, when faced with a choice to attend a large social gathering or stay at home and watch a movie alone or with a close friend, the introverted person would likely choose to stay at home. Similarly, some people are generally happy, sad, angry, polite, rude, etc. Personalities may or may not change as the person ages or experiences new environments or situations in life. Children are more apt to make rash, unreasonable decisions for instant satisfaction. Adults may be more apt to think about the repercussions of a decision before acting, resulting in a more reasoned response. So while an introverted personality may generally rule a person's decisions, the same choices or decisions over the course of the person's life may change as the person's age and experience changes.

Moreover, while a person may have a general personality that guides his or her decisions and actions in life, those same decisions and actions may change at any given time based on his or her mood at that time. The person's mood may be thought of as the person's personality at that instant. So while the introverted person is generally shy, at any given moment, the introverted person may be feeling daring and brave, which might lead that person to do something outside of the "norm" for that individual. The person's overall personality has not changed, but the instantaneous mood of the moment has guided that person's actions.

Conventional robots do not have personalities similar to human personalities. Any predisposition to shyness or aggression or any other category of actions that could be equated to personality is merely programmed into the system as a simple or complex set of "if-then" algorithms. However, according to embodiments described herein, the identifying self-conscious system 10 is provided with a personality waveform generator 90 that defines the general personality of the machine. The artificial personality is defined by the anatomy of a waveform.

For example, a waveform having a high frequency with very large amplitudes may define an artificial personality that is substantially more aggressive or even "hyperactive" as compared to an artificial personality defined by a waveform having a low frequency and relatively low amplitudes. A low frequency defines a smooth and calm underlying attitude. The low frequency might represent an adult that is wise and generally peaceful and altruistic in nature, someone who thinks about the consequences of their actions and makes reasoned responses that take into consideration the repercussions of their actions on others.

In contrast, a high frequency waveform characteristic might define an active or hyperactive personality, perhaps representing a child that is somewhat self-centered and only concerned with the immediate benefits of an action, without regard to the effect of the action on others. According to various embodiments, the subset of responses to any particular stimuli are selected according to the waveform using characteristics of the waveform such as frequency, amplitude, wavelength, or a combination thereof. For example, upon receiving stimuli from the sensors 500 indicating laughter is nearby, the computer 80 may determine that the waveform characteristics include a high frequency and a high amplitude. As a result, a subset of responses from the look-up table 400 are selected that correspond to different manners of deviating from a current task to explore the laughter and fun. If the waveform characteristics included a lower frequency and amplitude, a different subset of responses may be selected from the look-up table that include brief or no exploration while continuing the task at hand. It should be appreciated that these and all examples discussed herein are merely illustrative and not meant to be limiting. One with skill in the art would appreciate defining any characteristics of any type of waveform with personality characteristics and associated responses or subsets of responses accordingly.

Utilizing Light and its Shape to Create Mental Patterns

Light has an infinite spectrum of colors (wavelengths) and a continuous flow. Light waves can have narrow maximum variations (i.e., substantially small amplitude) to express a calm, passive, and feminine nature. Alternatively, light waves can have wide variations (i.e., substantially large amplitude) and express aggressive, active, and masculine nature. The electromagnetic spectrum illustrates the changing wavelength, frequency, and amplitude of a waveform as the wave transforms from a radio wave having an extremely long wavelength on the order of $10^3$ m with low frequency on the order of $10^4$ Hz, to a gamma wave with an extremely short wavelength on the order of $10^{-12}$ m and high frequency of $10^{20}$ Hz. The visible light spectrum is what humans see as colors, with different colors having different wavelengths and frequencies. According to various embodiments, the personality waveform generator 90 generates light and corresponding colors to define an artificial personality. The light wave characteristics associated with red may represent a first personality characteristic, while light wave characteristics associated with violet represents a second personality characteristic. It should be appreciated that any colors or even wave types (e.g., infrared, ultraviolet, or any other type of light or wave along the electromagnetic spectrum) may be used to define an artificial personality. According to one embodiment, the personality waveform generator 90 creates waveforms having wavelengths between about $10^{-5}$ m and $10^{-8}$ m and frequencies between about $10^{12}$ Hz and $10^{16}$ Hz. According to yet another embodiment, the personality waveform generator 90 creates waveforms having wavelengths between about $10^{-6}$ m and $10^{-7}$ m and frequencies between about $10^{13}$ Hz and $10^{15}$ Hz.

The personality waveform generator 90 may be internal to the identifying self-conscious system 10 or external. For example, the personality waveform generator 90 may include a light source 92 having one or more LEDs mounted within any portion of the identifying self-conscious system 10. The one or more LEDs may be programmed to illuminate with a particular color and intensity to create any desired light wave having any desired waveform characteristics according to an artificial personality profile. Light wave detection and measurement components within the identifying self-conscious system 10 are used to determine the characteristics of the light wave representing the artificial personality at the time of a corresponding stimuli in order to determine a proper response or subset of potential responses.

Different embodiments may utilize different waveform generation procedures for creating a desired light wave. A straightforward implementation includes providing a single color corresponding to specific artificial personality characteristics all or a majority of the time. With multiple identifying self-conscious systems 10, some systems may be programmed with certain colors to represent first artificial personalities, while other systems are programmed with other colors to represent different artificial personalities.

According to other embodiments, an identifying self-conscious system 10 includes a personality waveform generator 90 that alters the color or waveform characteristics according to any desired criteria. For example, an identifying self-conscious system 10 may have a personality waveform generator 90 that emits a light wave having a color corresponding to a calm, peaceful demeanor or personality at certain times of the day, days of the week, or seasons of the year, while altering the color at other times.

The personality waveform generator 90 may alternatively be external to the identifying self-conscious system 10. Specifically, light wave detection and measurement components within the identifying self-conscious system 10 may be used to determine the characteristics of the light wave created in the ambient environment. In these embodiments, the artificial personality of the machine may be dependent upon the light in its environment. Robots or machines that operate in low light or specific colors and characteristics corresponding to light from different light sources 92 may have varying personalities that correlate with those environments.

It should be appreciated that although the personality waveform generator 90 has been described with examples utilizing light waves created by a light source 92, the embodiments may alternatively utilize sound waves created by one or more audio sources 94. In these embodiments, the identifying self-conscious system 10 may utilize speakers internal or external to the machine. Alternatively, the identifying self-conscious system 10 may "hear" the waveform by analyzing an electrical signal created by the audio source 94 that would ordinarily be connected to a speaker to transform the electrical signal into an audible sound. One way to think of this would be as if the cord to the speaker were cut so that the signal is received and utilized to interpret the sound that the speaker would create if the speaker were installed. As with the external light source example above, embodiments may utilize external sounds within the ambient environment to define the artificial personality of the identifying self-conscious system 10.

Defining Moods

As mentioned above, not only does an identifying self-conscious system 10 possess an artificial personality that defines the boundaries of the potential responses to stimuli, embodiments provide for a "mood" of the identifying self-conscious system 10 at the instant of the stimuli to further define the potential responses or subset of responses. As previously discussed, responses or subsets of potential responses to stimuli are selected according to characteristics of a waveform generated by the personality waveform generator 90. The frequency or wavelength of the waveform may determine a subset of responses within the look-up table 400 from which the computer 80 will choose from. To further narrow the choices to a single response or a smaller subset of potential responses, the mood of the identifying self-conscious system 10 at the instant of the stimuli may be determined and utilized.

According to one embodiment, the specific amplitude of the waveform at the time T at which the stimulus was received may determine a response from the subset of potential responses, or may further narrow the subset. In these embodiments, the responses or subset of potential responses may correspond with specific values or ranges of values of the amplitude of the wave. Examples are provided and discussed below with respect to FIG. 8.

Exemplary System Modules

As noted above, various aspects of the system's functionality may be executed by certain system modules, including the system's consciousness module 100 and sub-consciousness module 200. The consciousness module 100 is adapted to reaffirm the existence of the system, to translate some stimuli into human language stimuli, and to make conscious response decisions to the human language stimuli, while the sub-consciousness module 200 is adapted to automatically select and execute a response to particular stimuli. The consciousness module 100 and sub-consciousness module 200 may be adapted to work in unison such that the system subconsciously responds to particular stimuli while consciously recognizing its own existence, and to make response decisions after "thinking" about the stimuli and response in a human language. Such an arrangement is adapted to mirror human behavior where a human may act instinctively or subconsciously (e.g., by breathing or walking) as well as intentionally or consciously. These modules are discussed in greater detail below.

Process for Transforming Sensory Input into Action

Figure 3:
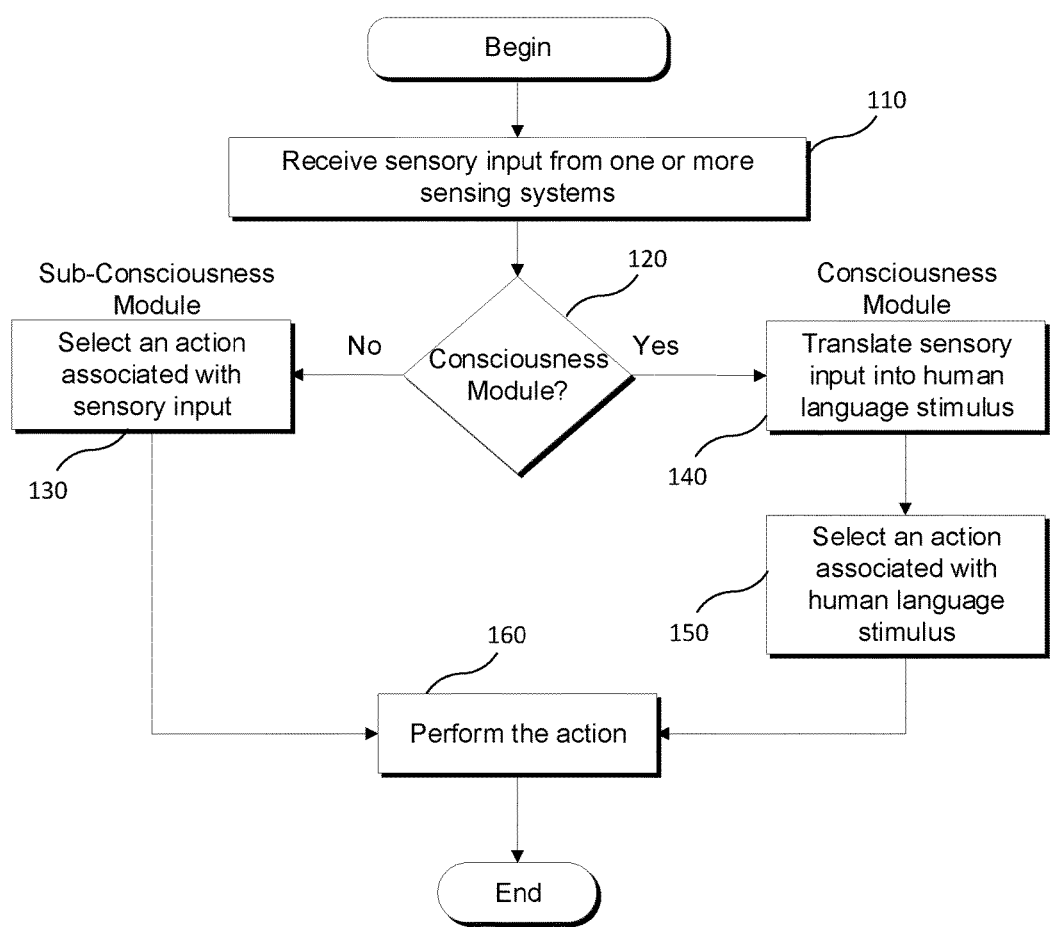
FIG. 3 depicts a flowchart that generally illustrates a routine for responding to stimuli according to a particular embodiment.

FIG. 3 is a flow chart that generally illustrates a routine for responding to stimuli according to various embodiments described herein. Beginning at Step 110, the system receives sensory input from one or more of the sensors 500. These sensors 500 may include, as shown in FIG. 1, a vision system 20, a sound sensor 30, a thermal sensor 40, a taste sensor 50, a touch sensor 60, a smell sensor 70 and/or any other suitable sensor. At Step 120, a determination is made as to whether the consciousness module 100 or the sub-consciousness module 200 is suitable for directing the response to the sensory input.

With humans, there are many actions that people take without any thought. For example, people walk without thinking about lifting one foot, advancing the foot, planting the foot, then repeating with the opposite foot. When faced with an emergency, people often act without thinking through the stimulus and response. For example, when a ball is thrown to or at a person, the targeted person will catch or dodge the ball without thinking about the action. These actions are all a part of sub-conscious thought. These automatic reactions are processed by the sub-consciousness module of the identifying self-conscious system 10.

In contrast, there are many stimuli that result in human thought before action. These are the situations in which humans think in their native language before determining how to respond. For example, a person might see a dog and think to themselves in their native language, "that is a cute puppy." They might then decide to walk over and interact with the animal. Or, depending on their mood, they may simply smile at the scene and decide to continue on their way. This is an example of conscious thought. There is a stimulus, the stimulus is processed and translated into human language, and after thought in the human language, an action is selected and taken. The sub-conscious and conscious response analysis, coupled with the translation of the stimulus into human language during conscious thought, distinguishes the embodiments described herein from traditional robots. Traditional robots are not and would not be configured to translate sensory input into a human language before responding since doing so adds complexity, steps, and time to perform an action based on an input.

The determination at Step 120 as to whether the stimulus will be processed by the sub-consciousness or consciousness module may be determined by reviewing the look-up table 400 for an association of the stimulus with the sub-consciousness or consciousness module. Certain critical or time-sensitive actions will be associated with the sub-consciousness module 200 for immediate action, while a majority of responses will be managed by the consciousness module 100. At Step 120, if the stimulus is to be processed by the sub-consciousness module 200, then the routine proceeds to Step 130, where an action associated with the sensory input is selected from the look-up table 400, and the action is performed at Step 160. However, if at Step 120 it is determined that the stimulus is to be processed by the consciousness module 100, then the routine proceeds to Step 140, where the sensory input is translated into a human language stimulus.

The identifying self-conscious system 10 is programmed to identify the stimulus and develop a description of the stimulus in a human language. For example, a visual image of an apple might result in a translation of that scene into "there is a green apple on that table." This translation is performed by the translation module 150. If the translation triggers an action based on stored instructions, then the human language translation is considered a human language stimulus or human language command. However, in one embodiment, the translation triggers further human language thought. In these situations, the translation is considered a human language observation. In this manner, the identifying self-conscious system 10 engages in thought. The system is thinking in a human language, with each thought becoming an observation that triggers further human language thought, or a trigger or stimulus for an action in response to the human language stimulus. The translation module utilizes stored questions and statements that relate to the received stimuli. For example, the system may be configured to translate the sensory input into one or more questions or statements like "that is (description of the input)," "what is . . . ," "why is . . . ," and any other appropriate questions or statements relating to the stimuli. When a question or statement is developed in the human language, the system may utilize past experiences stored in memory to answer the questions developed as observations from the stimuli.

Continuing the example above, after translating the visual scene into "there is a green apple on that table," based on a past experience, the system may follow up that observation with "John likes apples." Instructions within the memory or storage then trigger the system to select the action of giving the apple to John. It should be noted that the human language stimulus may be an unspoken human language stimulus that is not spoken or transmitted aloud into audible sound, or it may be a spoken human language stimulus that is actually played aloud via speakers of the identifying self-conscious system 10. From Step 140, the routine continues to Step 150, where an action associated with the human language stimulus is selected from the look-up table 400, and the action is performed at Step 160. It should be understood that according to various embodiments, the steps of selecting the action (Steps 130 and 150) include selecting the proper stored response according to the waveform defining the artificial personality of the system, as well as the mood of the system at the time of the sensory input, as described in detail above.

Consciousness Module

Figure 4:
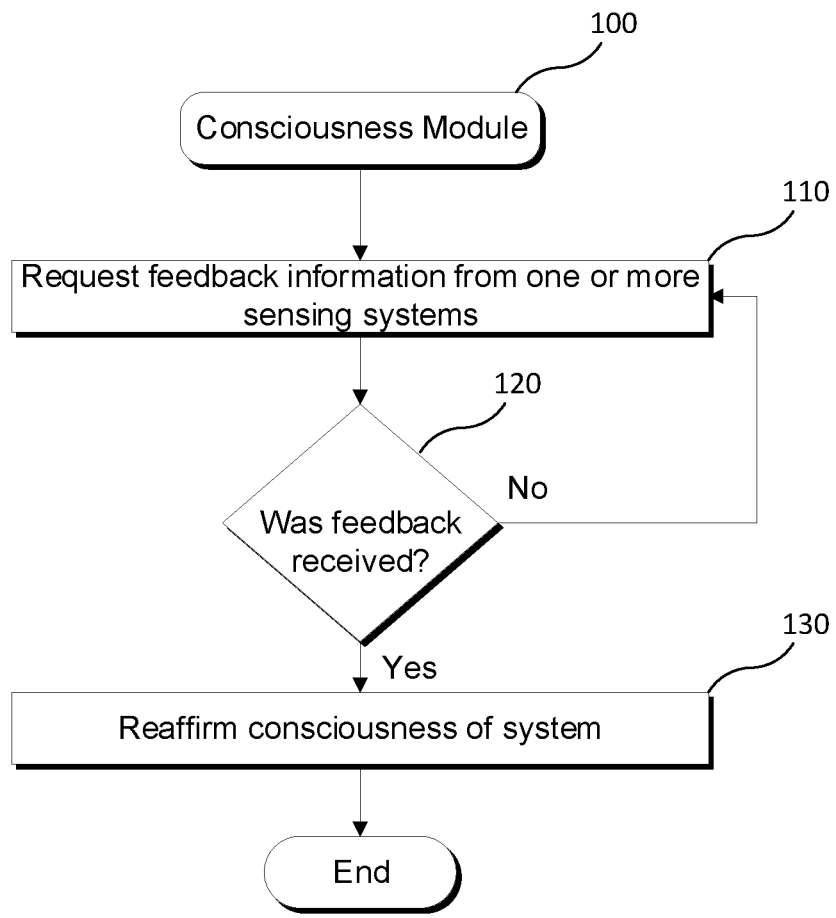
FIG. 4 depicts a flowchart that generally illustrates a consciousness module according to a particular embodiment.

FIG. 4 is a flow chart of an exemplary consciousness module 100 with respect to the process of reaffirming consciousness. As may be understood from FIG. 4, certain embodiments of the consciousness module 100 are configured to at least substantially continuously (e.g., continuously) confirm the system's existence and to remind the system of its own existence. Beginning at Step 110, the system requests feedback information from one or more sensing systems. These sensing systems may include, as shown in FIG. 1, a vision system 20, a sound sensor 30, a thermal sensor 40, a taste sensor 50, a touch sensor 60, a smell sensor 70 and/or any other suitable sensor. The system then, in Step 120, determines whether feedback was received by the system from any of the one or more sensing systems. Feedback may include, for example, a sound received by the sound sensor 30 or a touch received by the touch sensor 60. If the system receives no feedback from any of the one or more sensing systems at Step 120, the system returns to Step 110 to request feedback from the one or more sensing systems. If the system does receive feedback at Step 120, the system proceeds to Step 130.

In Step 130, the system, based at least in part on the reception of feedback at Step 120, is able to reaffirm its own existence. The system may reaffirm its own existence, for example, by relaying "I exist" to itself in response to the reception of feedback. By recognizing its own existence as a result of external stimuli that cause the reception of feedback from one or more of its sensing systems, the system is able to continually remind itself of its own existence. By continually reminding itself of its own existence, the system may be able to tell others that it exists, to understand its own existence, or to make it appear as if the system believes its own existence.

In various embodiments of the consciousness module 100, the feedback information requested from the one or more sensing systems at Step 110 may include substantially instantaneous (e.g., instantaneous) feedback information. For example, the system may request feedback from the sound sensor 30 at the current moment. If the sound sensor 30 is currently detecting a sound at Step 120, the system will reaffirm its existence at Step 130. In various embodiments of the consciousness module 100, the feedback information requested from the one or more sensing systems at Step 110 may include past feedback information. The system may request, for example, feedback information from a previous date or time (e.g., one week ago, last month, December 15$^{th}$). For example, the system may request feedback information from the smell sensor 30 from two weeks ago. If the smell sensor 30 detected an odor two weeks ago at Step 120, the system will reaffirm its existence two weeks ago at Step 130.

In various embodiments of the consciousness module 100, the system establishing and recognizing its own self-consciousness may allow the system to begin to value itself. In this way, the system may have ambitions or take action to preserve or improve itself. It may further be necessary for the system to recall both past and present feedback information for it to become fully self-conscious as humans are.

In various embodiments of the consciousness module 100, the system may be adapted to recognize the end of its own existence. After a certain number of cycles of the system receiving no feedback at Step 120 and returning to Step 110 to request feedback information from the one or more sensing systems, the system may be adapted to recognize that it no longer exists. The certain number of cycles may include: (a) a pre-determined number of cycles; (2) a substantially random (e.g., entirely random) number of cycles; and (3) any other appropriate number of cycles. For example, the certain number of cycles may be determined by the amount of time that the system has existed. For example, a system that has existed for a short time may recognize the end of its existence after a small number of cycles of receiving no feedback from its one or more sensing systems. A system that has existed for a longer period of time may go through more requests for feedback from its one or more sensing systems without receiving feedback before determining that it no longer exists.

Sub-Consciousness Module

Figure 5:
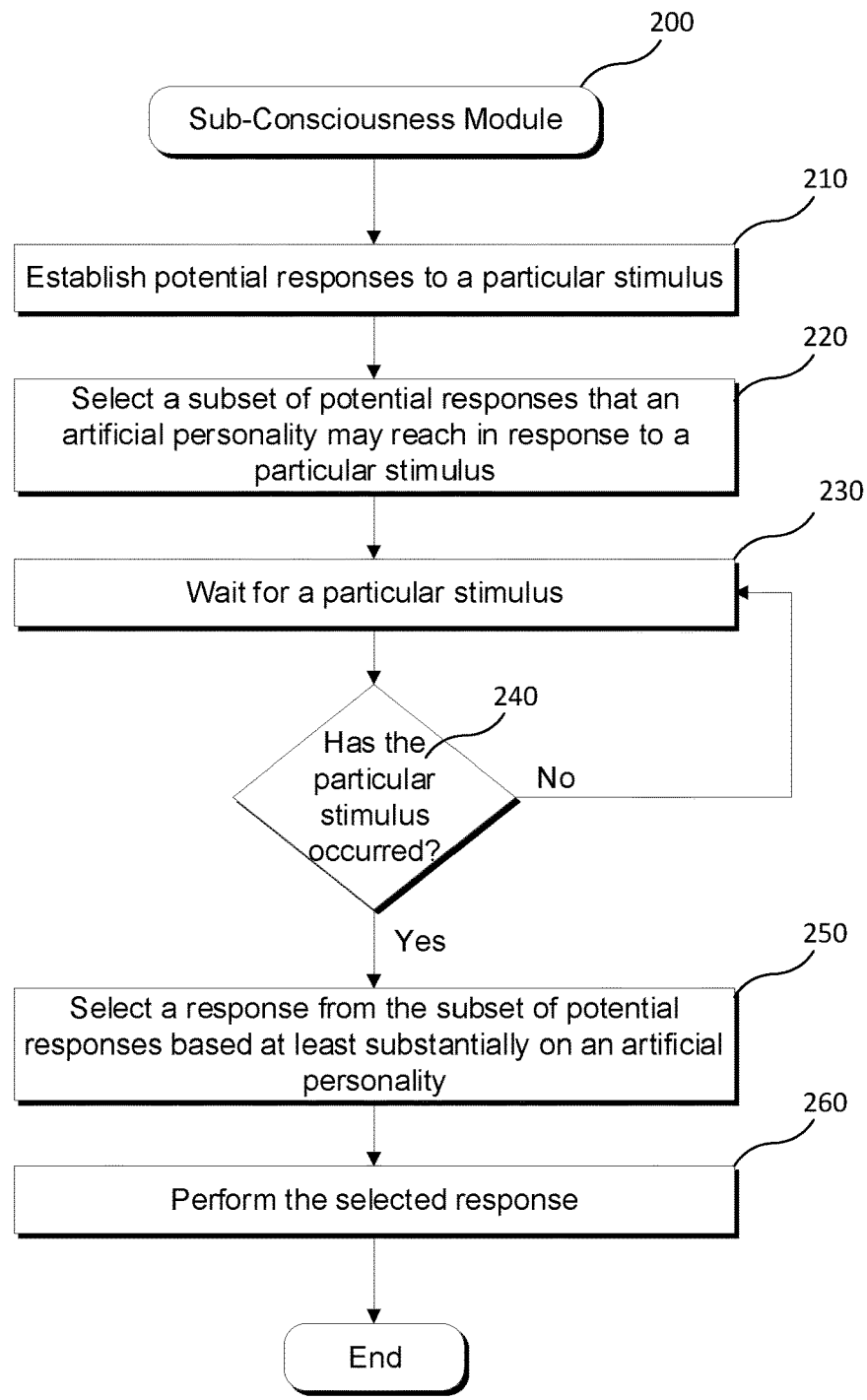
FIG. 5 depicts a flowchart that generally illustrates a sub-consciousness module according to a particular embodiment.

FIG. 5 is a flow chart of an exemplary sub-consciousness module 200. As may be understood from FIG. 5, certain embodiments of the sub-consciousness module 200 are configured to allow a system to respond sub-consciously to a particular stimulus. For example, the sub-consciousness module 200 may be used to select a response to a person making a threatening gesture. Beginning at Step 210, potential responses to a particular stimulus are established. Then, at Step 220, a subset of potential responses that an artificial personality may reach in response to a particular stimulus is selected from the potential responses established at Step 210. The subset of potential responses in Step 220 may be selected, for example, based on the pre-determined personality of an artificial personality. A system may be programmed to have a particular artificial personality based on the desired personality of the system. For example, if the desired personality of an artificial personality was a non-violent personality, the subset of potential responses at Step 220 would not include any potentially violent responses established at Step 210 in response to a person making a threatening gesture as mentioned above.

The system then, in Step 230, waits for a particular stimulus. The system then checks, in Step 240, whether the particular stimulus has occurred. If the particular stimulus has not occurred, the system returns to Step 230 and continues to wait for a particular stimulus. If a particular stimulus has occurred, the system continues to Step 250.

In Step 250, the system selects a response from the subset of potential response to the particular stimulus that has occurred based at least substantially on its artificial personality. The system then, in Step 260 performs the selected response.

Figure 6:
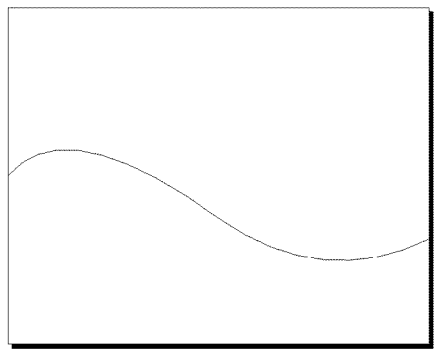
FIG. 6 depicts exemplary artificial personality waveforms.
Figure 6:
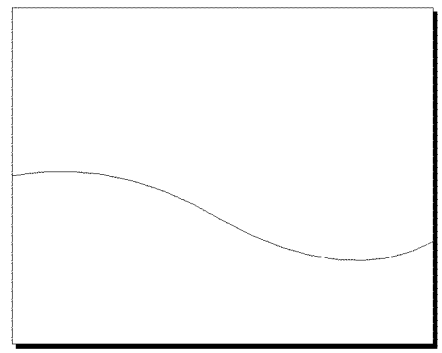
Figure 6:
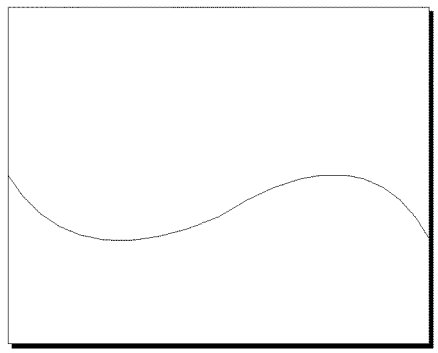
Figure 6:
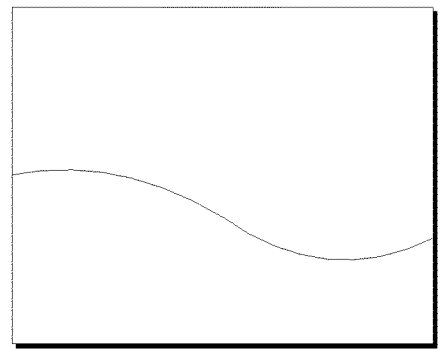

In various embodiments of the system, the system's artificial personality may be determined by at least one waveform. FIG. 6 shows four exemplary waveforms that may make up a particular artificial personality. These examples are merely simplified waveform segments shown for illustrative purposes and are not to be considered limiting. As discussed in detail above, the personality waveform generator 90 may provide complex waveforms, characteristics of which are used to select responses or subsets of responses to stimuli. FIG. 6 shows waveforms for the personality traits of tempo, happiness, humor, and reaction time. Various embodiments of an artificial personality may include other personality traits with their own associated waveforms. A waveform associated with a particular personality trait of an artificial personality may be predetermined. For example, a system may be assigned a waveform for humor that has a large amplitude and many fluctuations. Such a system may have the capacity for a more humorous response to a particular stimulus than other systems.

Figure 7:
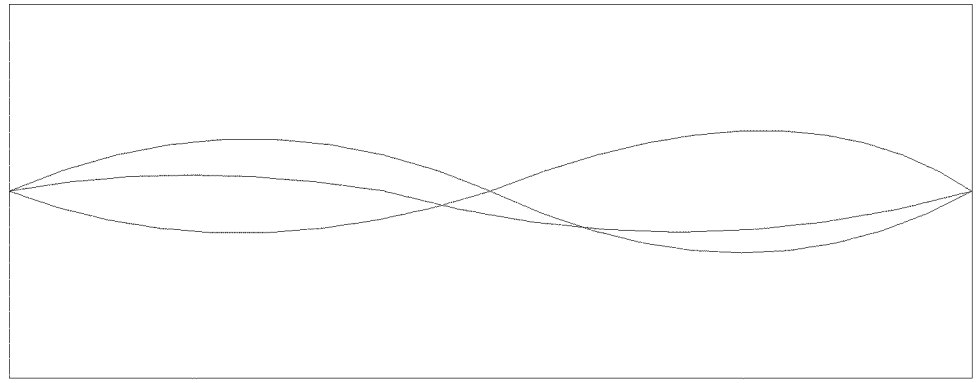
FIG. 7 depicts exemplary artificial personality waveform patterns.
Figure 7:
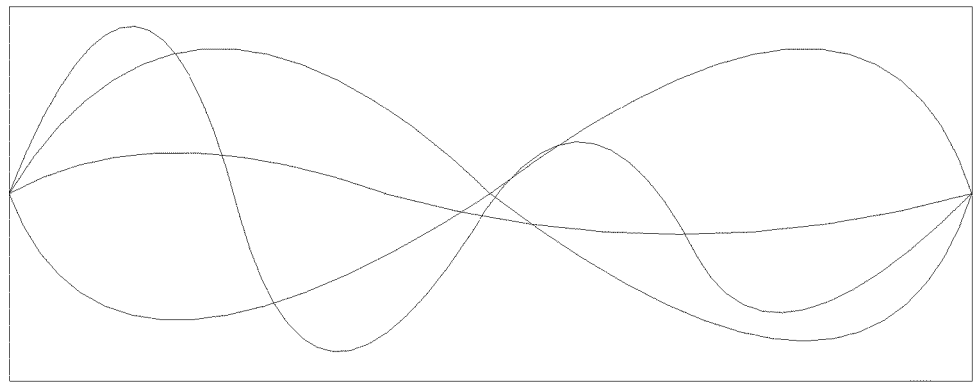

FIG. 7 shows two embodiments of a waveform for a personality trait. The waveform of Pattern 1 shows narrow maximum variations. A waveform taking the form of Pattern 1 may express calm, passive attributes of a particular personality trait. Pattern 2 shows a waveform with wide maximums and minimums and a lot of variation. A waveform like Pattern 2 may express an aggressive, active nature of a certain personality trait.

When selecting a response to a particular stimulus at Step 250, a system may be limited in its range of potential responses by the predetermined wave forms associated with its personality traits that make up its artificial personality. The waveforms may define the extremes of potential responses that a system may make to a particular stimulus. A response may then be selected at random within the range of potential responses defined by waveforms of various personality traits.

In various embodiments of the system, as previously discussed, the waveform may be a light waveform. Light waveforms may have an infinite spectrum of colors and wavelengths and a continuous flow. A light waveform may be highly variable and be represented by unlimited numbers of combinations of shapes, speeds, and colors. The light waveform of an artificial personality may be displayed on display device, such as the display device 64 of FIG. 2. In other embodiments, the light waveforms may be stored within a storage device such as the storage device 63 in FIG. 2.

Figure 8:
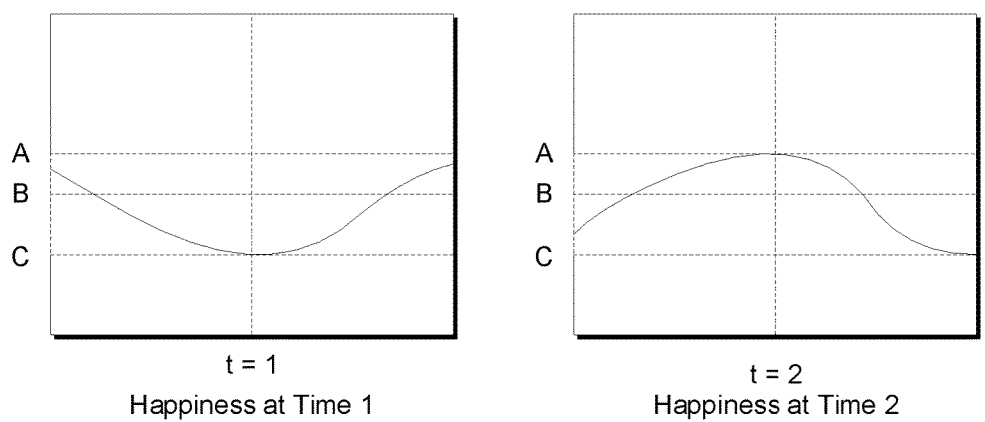
FIG. 8 depicts an exemplary artificial personality waveform at two different times.

In various embodiments, the system may determine the response by measuring the amplitude of the waveform at the time of a particular stimulus, which may correspond to the mood of the identifying self-conscious system 10. As may be understood from FIG. 8, the amplitude of a waveform for a particular personality trait may vary at different times. FIG. 8 shows a happiness waveform at two different times: Time 1 and Time 2. As may be understood from FIG. 8, different amplitudes of a waveform may correspond to different potential responses to a particular stimulus. For example, in the happiness waveforms of FIG. 8: (1) Amplitude A may correspond to a potential response including laughter; (2) Amplitude B may correspond to a potential response including a slight smile; and (3) Amplitude C may correspond to a potential response including crying. As shown in FIG. 8, a particular stimulus occurring at Time 1 may result in a response corresponding to Amplitude C. In this example, the response to the particular stimulus at Time 1 would be crying. As shown in FIG. 8, a particular stimulus occurring at Time 2 may result in a response corresponding to Amplitude A. In this example, the response to the particular stimulus at Time 2 would be laughter.

In various embodiments, the system may determine the response by measuring other attributes of the waveform at the time of a particular stimulus or during a range of time encompassing the stimulus. For example, the system may measure the shape of the waveform, or any other suitable attribute of the waveform (e.g., the wavelength or the speed).

In various embodiments of the identifying self-conscious system, the consciousness module 100 and sub-consciousness module 200 may run simultaneously such that the system subconsciously responds to particular stimuli while consciously recognizing its own existence. Such an arrangement is adapted to mirror human behavior where a human may act instinctively or subconsciously (e.g., by breathing or walking) as well as intentionally or consciously.

First Illustrative Example of Identifying
Self-Conscious System—Consciousness Module A first illustrated example of the identifying self-conscious system 10 via the consciousness module of FIG. 4 may include the identifying self-conscious system as part of a machine or robot. As may be understood from FIG. 1, a machine or robot may further include various sensing systems including a vision system 20, a sound sensor 30, a thermal sensor 40, a taste sensor 50, a touch sensor 60, a smell sensor 70. Other embodiments of a machine or robot that includes the identifying self-conscious system 10 may include any other suitable sensing systems (e.g., a Pressure Sensor). The identifying self-conscious system 10 may be adapted to communicate with the various sensing systems to receive feedback information from the various sensing systems.

At Step 110 of the consciousness module, the machine or robot may request feedback information from one or more of the sensing systems. For example, the machine or robot may request feedback from the vision system 20 and the sound sensor 30. The machine or robot will then determine, at Step 120, whether any feedback was received from the vision system 20 or sound sensor 30. This feedback could come, for example, in the form of movement detected by the vision system 20 or a noise detected by the sound sensor 30. If the machine or robot receives no feedback at Step 120, it will return to Step 110 to request feedback from the sensing systems again. In requesting feedback from the sensing systems, the machine or robot may request feedback from all systems simultaneously. Alternatively, the machine or robot may request feedback from each sensing system individually. The machine or robot may also request feedback from any combination of available sensing systems at Step 110. The machine or robot may request feedback information from the sensing systems that is instantaneous or from a previous time.

When the machine or robot receives feedback at Step 120, it continues to Step 130 where the machine or robot reaffirms its own existence. The machine or robot may substantially continuously (e.g., continuously) perform the steps of the consciousness module 100 in order to substantially continuously (e.g., continuously) reaffirm its own consciousness. Because it is constantly receiving feedback that indicates that it is interacting with the world around it, the machine or robot is constantly being reminded of its own existence.

By being constantly reminded of its own existence and becoming self-conscious, the machine or robot may be able to recognize and distinguish itself from other elements around it. By realizing its own existence, the machine or robot may recognize what belongs to itself including its physical self as well as its thoughts or feelings. By distinguishing itself from others, the machine or robot may begin to understand and create relationships between itself and others.

Second Illustrative Example of Identifying
Self-Conscious System—Sub-Consciousness
Module A second illustrated example of the identifying self-conscious system 10 via the sub-consciousness module of FIG. 5 may include the identifying self-conscious system as part of a navigation system. A navigation system may include a sound sensor 30 capable of recognizing and understanding human speech. The navigation system may also include an artificial personality defined by waveforms for various personality traits. For example a navigation system may include an artificial personality that includes a humor waveform that is very volatile and has a large amplitude such as the waveform of Pattern 2 in FIG. 7. The navigation system may further include an artificial personality with a happiness waveform that is passive and weak such as the waveform of Pattern 1 in FIG. 7.

In Step 210 of the sub-consciousness module 200, the navigation system may establish potential responses to a particular stimulus. For example, the navigation system may establish potential responses to being asked for directions to a location. These responses may include a wide variety of responses including providing the proper directions, providing improper directions, or providing no direction at all. The navigation system then, in Step 220, selects a subset of potential responses based on its artificial personality. For example, because this navigation system has a passive and weak happiness waveform, the navigation system may eliminate potential responses from the subset of potential responses that are overly cheerful. A potential response that provides the correct directions and then wishes the person requesting directions a nice day, for example, may not be selected for the subset of potential responses based on the artificial personality described in this example.

The navigation system then, in Step 230, waits for a particular stimulus. In this example, the navigation system waits for someone to ask for directions to a location. When the navigation system determines at Step 240 that someone has asked for directions, it continues to Step 250 and selects a response from the subset of potential responses. The selection of a response at Step 250 may be performed in a substantially random (e.g., random) manner from the subset of potential responses that fit within the artificial personality of the navigation system. For example, because the navigation system has a volatile humor waveform, the response selected at Step 250 may involve providing incorrect directions as a joke. Finally, at Step 260, the navigation system may perform the selected response. In this example, the navigation system would provide the wrong directions as a joke. In other embodiments, where the navigation system is programmed to have a volatile temperament, the navigation may, for example, refuse to provide directions if its current waveform dictates an unfriendly response.

Third Illustrative Example of Identifying
Self-Conscious System—Sub-Consciousness
Module A third illustrated example of the identifying self-conscious system 10 via the sub-consciousness module of FIG. 5 may include the identifying self-conscious system as part of a robot. The robot may further include various sensing systems including a vision system 20, a sound sensor 30, a thermal sensor 40, a taste sensor 50, a touch sensor 60, and a smell sensor 70. Other embodiments of a robot that includes the identifying self-conscious system 10 may include any other suitable sensing systems (e.g., a Pressure Sensor). The identifying self-conscious system 10 may be adapted to communicate with the various sensing systems to receive feedback information from the various sensing systems. The robot may also include an artificial personality defined by various personality traits defined by one or more waveforms. In this example, the robot may have a violence waveform that is aggressive and active.

In Step 210 of the sub-consciousness module 200 the robot may establish potential responses to a particular stimulus. For example, the robot may establish potential responses to a threat. These responses may include a wide variety of responses including screaming, talking to the source of the threat, and committing a violent act. The robot then, in Step 220, selects a subset of potential responses based on its artificial personality. For example, because this robot has an aggressive, active violence waveform, the robot may include potential responses in the subset of potential responses that are particularly violent. A potential response that includes injuring the source of the threat may be selected for the subset of potential responses based on the artificial personality described in this example.

The robot then, in Step 230, waits for a particular stimulus. In this example, the robot waits for someone to threaten it. When the robot determines at Step 240 that someone has threatened it, it continues to Step 250 and selects a response from the subset of potential responses. The selection of a response at Step 250 may be done in a substantially random manner from the subset of potential responses that fit within the artificial personality of the robot. For example, because the robot has an aggressive violence waveform, the response selected at Step 250 may include punching the source of the threat. Finally, at Step 260, the robot may perform the selected response. In this example, the robot would punch the source of the threat.

Robots with other artificial personalities may have a subset of potential responses that differs from the robot in this example. For example, a robot with a calm, passive violence waveform may not include the commission of any violent act in the selection of a subset of potential responses to a threat at Step 220. Such a robot may, when faced with a threat, select a response form a less violent subset of potential responses. A robot with a passive violence waveform may include talking to the source of the threat or reasoning with them in its subset of potential responses. At Step 260, the robot may perform the selected response by talking it out with the source of the threat.

Fourth Illustrative Example of Identifying
Self-Conscious System—Thinking in Language In various embodiments, a system may be adapted to think using its voice. In order to more closely recreate human behavior, the system may be adapted to think in some sort of language. Humans, for example, think in their own language and would be unable to understand or known something in a language with which they were not familiar. In various embodiments, a system may say "let me think about that" when determining a response to a particular stimulus. For example, the navigation system of the Second Illustrative Example above may, when asked for directions, say "let me think about it" before determining its response (e.g., providing incorrect directions or not providing any directions). In this way, the system may appear as though it is actually determining responses to various stimuli on its own, rather than based on pre-determined waveforms. The system may even begin to think that it is making these determinations on its own, thereby contributing to its state of self-consciousness.

Alternative Embodiments

Alternative embodiments of the identifying self-conscious system 10 may include components that are, in some respects, similar to the various components described above. Distinguishing features of these alternative embodiments are discussed below.

1. Substantially Random Response Selection

In particular embodiments of the sub-consciousness module 250, the response to a particular stimulus at Step 250 may be selected in a substantially random manner (e.g., an entirely random manner). Such selection may occur without consideration of an artificial personality.

2. Other Waveform Embodiments

In particular embodiments, the waveform may include a liquid waveform. The liquid waveform may define a personality trait by its depth, the texture of its surface, or any other suitable characteristic of the liquid waveform. In particular embodiments, the waveform may include a figure waveform. The figure waveform may define a personality trait by its shape, color, surface, or any other suitable characteristic of the figure waveform.

CONCLUSION

Many modifications and other embodiments of the invention will come to mind to one skilled in the art to which this invention pertains having the benefit of the teachings presented in the foregoing descriptions and the associated drawings. For example, as will be understood by one skilled in the relevant field in light of this disclosure, the invention may take form in a variety of different mechanical and operational configurations. Therefore, it is to be understood that the invention is not to be limited to the specific embodiments disclosed and that modifications and other embodiments are intended to be included within the scope of the appended exemplary concepts. Although specific terms are employed herein, they are used in a generic and descriptive sense only and not for the purposes of limitation.

What I claim is:

1. A computer-implemented method for transforming sensory input received at a machine into actions by the machine, the method comprising:
   receiving a first sensory input from one or more sensors;
   determining that the first sensory input corresponds to a consciousness module;
   in response to determining that the first sensory input corresponds to the consciousness module, translating the first sensory input into a human language to create a human language stimulus;
   selecting a first action corresponding to the human language stimulus; and
   performing the first action in response to the human language stimulus.

2. The computer-implemented method of claim 1, further comprising:
   receiving a second sensory input from the one or more sensors;
   determining that the second sensory input corresponds to a sub-consciousness module;
   selecting a second action corresponding to the second sensory input; and
   performing the second action in response to the second sensory input.

3. The computer-implemented method of claim 2, wherein selecting the second action corresponding to the second sensory input comprises selecting the second action in a lookup table stored in memory.

4. The computer-implemented method of claim 2, wherein selecting the second action corresponding to the second sensory input comprises:
   selecting a list of potential responses according to a characteristic of an artificial personality associated with the machine; and
   selecting the second action from the list of potential responses.

5. The computer-implemented method of claim 4, wherein the characteristic corresponds to a waveform.

6. The computer-implemented method of claim 5, wherein the waveform is generated by light.

7. The computer-implemented method of claim 6, wherein the list of potential responses corresponds to a frequency, wavelength, and amplitude of the waveform.

8. The computer-implemented method of claim 7, wherein the list of potential responses corresponds to the frequency, wavelength, and amplitude of the waveform such that a first waveform having a first frequency, a first wavelength, and a first amplitude corresponds to a first list of potential responses that are each more neutral than a second waveform having a second frequency that is higher than the first frequency, a second wavelength that is shorter than the first wavelength, and a second amplitude that is higher than the first amplitude.

9. The computer-implemented method of claim 5, wherein the waveform is generated by sound.

10. The computer-implemented method of claim 1, wherein determining that the first sensory input corresponds to the consciousness module comprises:
   determining that the first sensory input is excluded from a list of sensory inputs corresponding to the sub-consciousness module.

11. The computer-implemented method of claim 1, wherein selecting the first action corresponding to the human language stimulus comprises:
   selecting a list of potential responses according to a characteristic of an artificial personality associated with the machine; and
   selecting the first action from the list of potential responses.

12. The computer-implemented method of claim 11, wherein the characteristic corresponds to a waveform created by a light source or an audio source.

13. The computer-implemented method of claim 12, wherein the waveform is generated internally to the machine.

14. The computer-implemented method of claim 12, wherein the waveform is generated externally to the machine.

15. The computer-implemented method of claim 12, further comprising:
   in response to selecting the first action from the list of potential responses, translating the second action into the human language to create a human language command; and
   in response to the human language command, performing the first action.

16. The computer-implemented method of claim 15, wherein the human language command is not audibly emitted from the machine.

17. A system for transforming sensory input received at a machine into actions by the machine, the system comprising:
   one or more sensors;
   memory;
   at least one processor;
   a consciousness module stored in the memory and coupled to the at least one processor, the consciousness module operative to
      receive a first sensory input from the one or more sensors,
      translate the first sensory input into a human language to create a human language stimulus,
      determine whether the human language stimulus requires a first action, and
      if the human language stimulus requires the first action, perform the first action;
   a sub-consciousness module stored in the memory and coupled to the at least one processor, the sub-consciousness module operative to
      receive a second sensory input from the one or more sensors,
      select a second action corresponding to the second sensory input, and
      perform the second action in response to the second sensory input; and
   a personality waveform generator operative to generate a waveform corresponding to an artificial personality,
   wherein the first action or the second action may be selected according to the waveform at a particular time or a particular time range associated with the first sensory input or the second sensory input.

18. The system of claim 17, wherein the personality waveform generator comprises a light source configured to produce a light wave, and wherein the waveform comprises the light wave.

19. The system of claim 18, wherein the light source comprises one or more LEDs.

20. The system of claim 17, wherein the personality waveform generator comprises an audio source configured to produce a sound wave, and wherein the waveform comprises the sound wave.

21. The system of claim 20, wherein the first action or the second action is selected from a list of potential responses corresponding to a frequency, wavelength, and amplitude of the waveform.

22. A computer-implemented method for transforming sensory input received at a machine into actions by the machine, the method comprising:
   receiving a first sensory input from one or more sensors;
   translating the first sensory input into a human language to create a human language observation;
   in response to the human language observation, creating an unspoken human language stimulus;
   selecting a first action corresponding to the unspoken human language stimulus from a plurality of responses defined by a light wave, the light wave corresponding to an artificial intelligence associated with the machine; and
   performing the first action in response to the human language stimulus.

23. The computer-implemented method of claim 22, wherein the first action is selected from a list of potential responses corresponding to a frequency, wavelength, and amplitude of the light wave.

24. The computer-implemented method of claim 23, wherein the frequency, wavelength, and amplitude of the light wave corresponds to a time of the first sensory input such that the light wave simulates a mood of the artificial intelligence at the time associated with the first sensory input.

* * * * *